United States Patent [19]

Gaertner

[11] 4,039,250
[45] Aug. 2, 1977

[54] DEVICE FOR SIGNAL TRANSMISSION BY MEANS OF OPTICAL CONDUCTORS

[75] Inventor: Waldemar Gaertner, Wenden, Germany

[73] Assignee: Siemens Aktiengesellschaft, Berlin & Munich, Germany

[21] Appl. No.: 664,875

[22] Filed: Mar. 8, 1976

[30] Foreign Application Priority Data

Apr. 24, 1975 Germany .............................. 2518241

[51] Int. Cl.² .............................................. G02B 5/16
[52] U.S. Cl. ................................. 350/96 B; 350/96 R
[58] Field of Search ................ 350/96 B, 96 BC, 96 R

[56] References Cited

U.S. PATENT DOCUMENTS

| 3,481,195 | 12/1969 | Hendrickson et al. | 350/96 B |
| 3,825,336 | 7/1974 | Reynolds | 350/96 B |

FOREIGN PATENT DOCUMENTS

| 1,388,073 | 3/1975 | United Kingdom | 350/96 B |

OTHER PUBLICATIONS

Graff et al., "Large Area Probe," IBM Tech. Sisc. Bullet., vol. 18, No. 1, June 1975, pp. 189-190.

Primary Examiner—John K. Corbin
Assistant Examiner—Stewart Levy
Attorney, Agent, or Firm—Hill, Gross, Simpson, Van Santen, Steadman, Chiara & Simpson

[57] ABSTRACT

A device for the transmission of light by optical conductors which are arranged in a plurality of bundles that extend between a display surface and a source of illumination and which are gathered together into a strand of conductors at either the display surface or source of illumination characterized by a coupling device, which may be separate or integral with the strand of gathered conductors, disposed at the strand to obtain substantially equal distribution of the intensity of light leaving the conductors. The coupling device comprises a plurality of light conducting elements which are arranged in conductor bundles at the one end and in the strand of conductors at the other end and which elements at a point spaced from one end are spread into a substantially flat band or layer of elements which is subsequently spirally wound around a common axis extending parallel to optical conductors so that the conducting elements of each of the bundles are substantially uniformly distributed across the area of the opposite end of the coupling means. The conducting elements during the method of forming the coupling means may be held in their spread position by a carrier element or layer which carrier element subsequent to winding may be retained or removed as desired. If the carrier element is to be removed, an additional securing means may be added adjacent the end of the wound layer of conductor elements prior to removing the carrier element.

10 Claims, 4 Drawing Figures

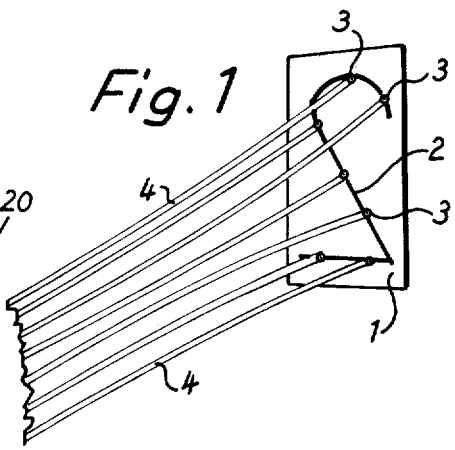
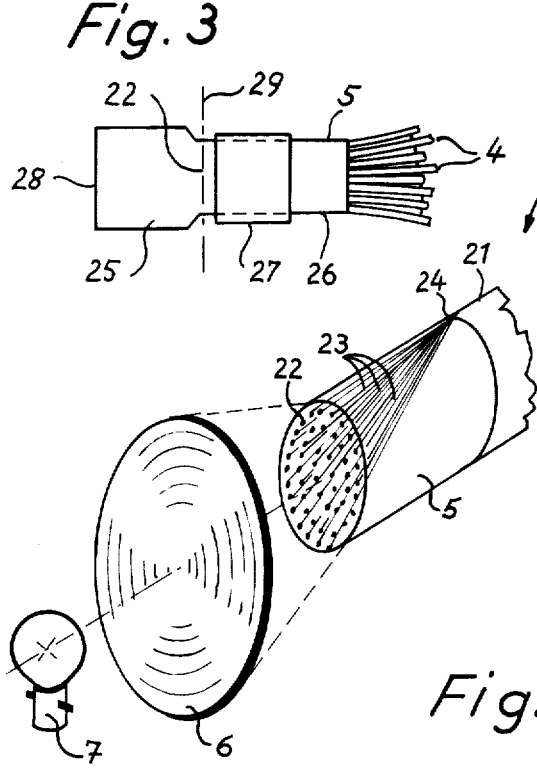
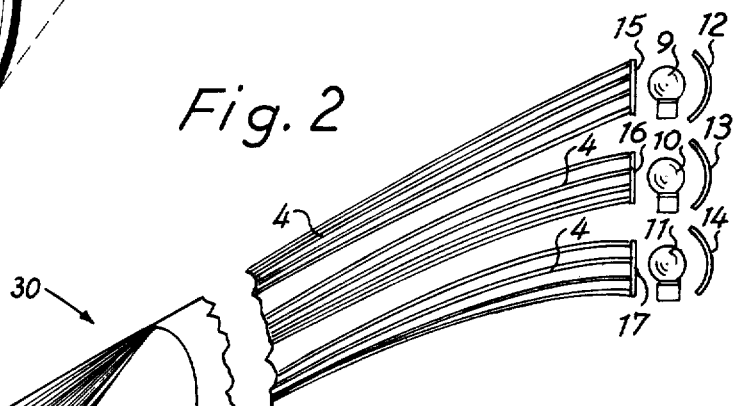
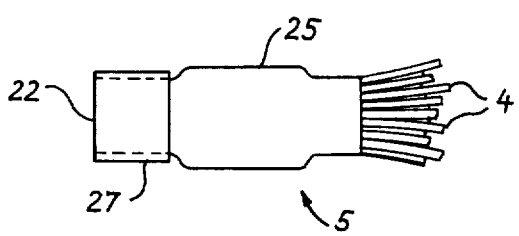

DEVICE FOR SIGNAL TRANSMISSION BY MEANS OF OPTICAL CONDUCTORS

BACKGROUND OF THE INVENTION

1. Field of the Invention

The present invention relates to a device for the transmission of light by means of optical conductors between a first and second location and particularly useful in either an apparatus for representing symbols on a display surface or an optical display apparatus for railroad and street traffic control devices.

2. Prior Art

Optical conductors have been used for projecting and illuminating purposes. These optical conductors usually consist of flexible light guiding fibers in which light entering one end of the fiber or element is conducted to the opposite end by multiple total internal reflection along the exterior surface of the fiber. Since these optical fibers are usually extremely thin and only have a thickness of a few $\mu$, they are usually gathered together in bundles of approximately 500 fibers or elements and provided with an outer coating or jacket which acts as a tube or jacket for protecting the fibers or elements against mechanical influences.

If an image is projected at one end of a group of conducting elements or fibers and is to be displayed on a surface at the other end, each of the conducting fibers or elements must be maintained in a known position with the position of the output end of each fiber corresponding to the position of the input end. However, when a conductor bundle of fibers or elements is used for pure and simple illumination, the optical fibers or elements within a bundle may be unordered and the positions of the ends of each fiber or element may assume any arbitrary position. Thus, the use of one or more conductor bundles in a pure and simple illumination application enables construction of the bundles at a substantially lower cost than when the fibers are used for transmitting an image.

German Gebrauchsmuster No. 1,952,072 discloses an example of a device or arrangement for illuminating symbols utilizing a plurality of conductor bundles and which contains one or more conducting elements. As illustrated in FIG. 1 of this example of prior art, an image, such as a number, is composed of a plurality of pictures or image points which are illuminated in accordance to need. To illuminate each of the points, a light guiding cable or bundle of light conducting elements or fibers is provided for each point and extends from a source of illumination to the respective individual image point on the display surface.

In use of such a prior art device, it has been shown that the intensity of illumination at the individual raster or picture points of the image is different from point to point. The intensity fluctuations increase as the number of conductor bundles proceeding from each illuminating body or source increases. It is believed that the reason for the fluctuations in the light intensity is that the individual conductor bundles are gathered together into a conductor strand or cable adjacent the source of illumination and form a closely compact surface element which is the light entry surface of the conductor strand. The intensity of illumination for each of the individual raster points is then dependent on the light distribution across the light entry surface which is formed by the ends of the gathered together conductor bundles. This light distribution is dependent on the construction of the illuminous source and on the composition and quality of any reflectors or condenser lenses which are used for projecting the light from the source onto the entry surface.

It has been suggested that the disadvantage of a nonuniform illumination of individual image points could be avoided by arranging the optical conductors or fibers in a uniform distributionn at the end at which they are brought together in the conductor bundle or where several conductor bundles are gathered into a conductor strand. However, while such arrangements are theoretically possible, they involve expensive manufacturing steps and thus prevent the economical use of the arrangement.

SUMMARY OF THE INVENTION

The present invention is directed to an improvement in a device for the transmission of light by means of optical conductors between a first and second location and particularly useful in both an apparatus for the representation of symbols on a display screen and an optical display apparatus for railroad and street traffic control which device includes a source illumination, a display surface and a plurality of conductor bundles with each bundle being composed of a plurality of individual optical conductors, said conductors being positioned with the light input end being disposed adjacent the source of illumination and the output end being disposed adjacent the display surface, said bundles being gathered together into a strand of conductors at one of said input and output end with the improvement permitting a simple way of obtaining an approximate uniform light distribution of the light either entering or exiting each of the conductor bundles.

To accomplish this feature, the improvement of the present invention comprises light mixing means or coupling means for obtaining a substantially uniform distribution of the intensity of light leaving the strand of the conductors, said coupling means having a first and second end and being disposed with the first end at the bundles and with the second end at one end of the strand. The coupling means comprises a plurality of individual light conducting elements arranged in conductor bundles at the first end with one conductor bundle of the coupling means associated with the strand of conductors, said conducting elements at a point spaced from said first end being spread into a substantially flat layer of elements spirally wound around a common axis extending parallel to the optical conductor so that the conducting elements of each bundle of the coupling means are uniformly distributed across an area of the second end of said means. The coupling means may be either a separate coupling piece or integrally formed with the one end of the strand with the bundles of the coupling means being the conducting bundles of the strand.

To form the light mixing means or coupling means, the method comprises providing a plurality of conductor elements gathered into individual conductors, spreading the conductor elements at a point spaced from but near by the first end into a flat layer of elements, winding the flat layer of the elements spirally around an axis extending parallel to the axis of the coupling means so that the conductor elements of each of the conductor bundles are uniformly distributed across an area of the second end of the coupling means. To hold the spread elements in that flat layer, a carrier element may be applied adjacent the second ends of the elements and then subsequently wound with the layer of spread elements. In addition, an additional securing means such as the shrink-on tube may be applied to the wound layer to hold the layer in the wound condition. After applying the additional securing means, the carrier member can be subsequently removed such as by selectively heating or etching. In one embodiment of the invention, the carrier member or element is disposed at the ends of the conducting elements with the additional securing means disposed inwardly therefrom and subsequent to the step of applying additional securing means, the carrier member and the portions of the conducting elements engaged thereby are removed from the coupling means by severing or cutting.

BRIEF DESCRIPTION OF THE DRAWINGS

FIG. 1 is a diagrammatic view with portions broken away for purposes of illustration of a device in accordance with the present invention utilized in an alpha numeric symbol display;

FIG. 2 is a diagrammatic perspective view of the device in accordance with the present invention utilized in an optical light signal;

FIG. 3 is a diagrammatic side view of an embodiment of the coupling means illustrating an embodiment of the method of manufacture; and FIG. 4 is a diagrammatic side view of another embodiment of the coupling means illustrating another embodiment of the method of manufacture.

DESCRIPTION OF THE PREFERRED EMBODIMENTS

The principles of the present invention are particularly useful in a device which is generally indicated at 20 in FIG. 1 and which is used for the transmission of light by means of optical conductors between a surface of a display panel 1 and a source of illumination 7.

As illustrated, the panel 1 has a plurality of image points or picture points 3, which are arranged in a pattern to form a symbol 2 thereon. Only a few of the image points 3 are actually illustrated in the figure for purposes of illustration. The panel 1 may be, for example, a nontransparent panel having apertures or openings to provide the image points 3 and these apertures are arranged in a pattern to produce the desired character or symbol 2. Into each of the openings 3 from the rear surface of the panel, a light conductor bundle 4 is inserted or plugged. Each of the light conducting bundles 4 will consist of a number of optical conductors or conducting elements which may be optical fibers. In most instances, it is desirable to provide a coating or jacket on each of the bundles of optical fibers or optical conductors to prevent the influence of external light and to minimize or protect against external mechanical influences. At a distance from the panel 1, the individual conductor bundles 4 are gathered together into a strand 21 of conductors and form a coupling means or cuff 5 which has an entrance surface 22 that is illuminated by light from illuminating body or source 7 and projected thereon through a condenser such as a condenser lens 6.

To obtain a substantially uniform illumination of each individual raster picture point 3, the optical conductors or elements of each bundle 4 are spread into a flat conductor layer in a region adjacent to the light entry surface 22 of the strand of conductors. This flat layer is then wound spirally around a common main axis which extends parallel to the optical conductors and is subsequently fixed in place. Thus, the resulting distribution of the conducting fiber belonging to a particular conducting bundle will be distributed over the entire surface 22 as schematically illustrated by the conductor elements 23 extending from a point 24.

To produce the coupling means or light mixing means 5, the protective coating or tubing which surrounds the conducting elements of each bundle 4, if present, is removed for several centimeters adjacent to the light entry surface 22. The exposed optical conductors or fibers of each individual bundle are then gathered together, aligned by a combing process and subsequently spread or fanned out so that a flat layer of conducting elements is produced. It is desirable to strive to have the individual conducting elements or fibers within the layer lie next to one another in substantially a single plane so that the layer has a thickness of approximately one conducting element. The thus aligned conducting elements or fibers are preferably secured on a carrier member or body which can, for example, be adhesive tape or be a lacquer layer. The flat layer of conducting elements and the carrier member are then wound together around the common main axis which extends substantially parallel to the optical conductors and subsequently the wound layer is fixed or secured in place. The winding of the layer of conducting elements distributes the conducting elements or fibers of each conductor bundle over either the entire light entry surface 22 or a substantial portion of the area of the strand of conductors. While this distribution does not result in an absolute uniform distribution, it is sufficiently complete to ensure a substantially uniform intensity of illumination for each of the raster or picture points 3. Thus, by winding the layer of elements for each bundle spirally as described hereinabove, the elements are spread out over a large area of the surface 22. Thus, if the surface 22 has different portions receiving different intensities, each bundle will have some of the optical fibers or conducting elements disposed in each of the areas so that the sum of the intensity of the light received by the conducting elements of each of the bundles 4 will be substantially the same.

If a large number of conductor bundles 4 are gathered together into the strand, then the formation of a single layer of conducting elements for all of the bundles will be difficult. In such a case, it is expedient to gather together the conducting elements of a given number of bundles into separate layers which layers are then assembled together in a stack and then subsequently wound about the common axis.

By virtue of the carrier member, the wound layer of individual conducting elements in the region or portion of the carrier member will have a greater diameter or circumference than the other portion of the wound layer which other portion is free of the carrier member. This relationship is illustrated in FIG. 3, and the region having the carrier member is indicated at 25 and is of a larger diameter or circumference than the other portion 26 of the coupling means. In many instances, the presence of this enlarged circumference or diameter which is created by the region 25 is undesirable.

In accordance with the present invention, this enlarged circumference can be reduced by the following process. After winding, an additional securing means 27 is applied adjacent to the thickened region 25 to hold the wound layer in position. As illustrated, the carrier member or adhesive layer was applied to the conducting elements at their ends which form a surface 28. Subsequent to the addition of the additional securing means 27, the thickened portion 25 of the wound layer and carrier member is removed by cutting the carrier member and the fibers engaged thereby along a plane indicated by dash line 29 to produce the entrance surface 22. Subsequent to removing the thickened portion 25, the surface 22 is polished as required. It is noted that by removing or separating the thickened portion 25 from the coupling means 5, the remaining portion of the coupling means 5 has a diameter or a circumference which is satisfactory.

In FIG. 4, another approach for compensating for the thickened portion 25 is illustrated. In this particular figure, the carrier member was spaced axially inward from the free ends of the fibers so that the thickened portion 25 is spaced inwardly from the entrance surface 22. After the layer of fibers in the carrier member have been wound, an additional securing means 27 is applied between the thickened portion 25 and the surface 22. In this solution to the problem of thickened portion, the thickened portion 25 is spaced from the free ends so that the end of the coupling means may be plugged in as necessary.

The application of the additional securing means 27 can be accomplished by tying or wrapping the wound portion with a tape or other securing means or by applying a tube of material which can be shrunk onto the wound layer to provide a compressing and holding force to retain the elements in the wound position. In the solution illustrated in FIG. 4, the thickened portion 25 can be removed after the application of the securing means 27 by utilizing material for the carrier member which can be either selectively removed by etching or selectively removed by heating. It should be pointed out that the removal of the thickening portion 25, which is located either at the end or spaced inward from the end, enable the coupling means to be telescopically received in the sleeve to form a plug-like connection between the coupling means and some other mechanical device. In the device 20 which is illustrated in FIG. 1 and is an example of a device which uses the coupling device of the present invention, the light conductor bundles 4 extend from the illuminating body and are engaged in separate apertures of the display surface. The entrance surface 22 of the conducting elements either may be engaged with the illuminating body forming the source of illumination 7 or may terminate at a set distance in front as illustrated.

As described, the coupling means illustrated in FIG. 1 was integral with the strand 21 formed by gathering the conducting bundles 4 together. It is possible that the coupling means 5 be formed as an individual unit. In such an instance, the coupling means will include a plurality of bundles of individual light conducting elements or fibers which are gathered together at a first surface facing the strand 21 of gathered light bundles 4. Each of the bundles will have the individual elements spread out in the coupling means into a flat layer which is subsequently wound around the common axis to provide a distribution of the individual fibers of each of the bundles of the coupling means on the light entrance surface 22. In other words, if the coupling means 5 is an individual member, it is formed in the same manner as described when it is formed integral with the end of the strand 21 and utilizes the bundles of light conducting fibers of the strand.

In FIG. 1, the invention is illustrated for conducting light from a source 7 to a display 1. The invention of the coupling means may also be used for conducting light or light signals from a source of illumination to either a digital indicator, a photoelectrically controlled devices or a display of a traffic control system.

In FIG. 2, a device, which is generally indicated at 30, utilizes a coupling means 18 in accordance with the present invention. In the device 30, the coupling means or device 18 instead of being placed adjacent to the source of illumination is placed adjacent to or in contact with the light exit end of the conducting bundles 4. In the particular device 30, a light dispersion disk, such as signal plate 8, is spaced from an end surface 31 of the coupling means 18. The plate 8 is to be illuminated with light of different colors and is useful in traffic signals when illuminated with red, green or yellow light at prescribed intervals. To achieve this purpose, signal lamps 9, 10 and 11 are provided and are sequentially turned on and off in accordance to the desired sequence of different colors for the display 8. The lamps 9, 10 and 11 may be equipped with a reflector 12, 13 and 14 (respectively) and may be either provided with a coating of the desired color or may illuminate a color filter such as 15, 16 or 17 to produce the desired colored light signal. As illustrated, each of the color filters 16, 17 and 18 has a plurality of individual light conductor bundles 4 extending therefrom and to the coupling means 18. In the coupling means 18, which may be integral with the strand of the bundles 4 or a separate member or piece as mentioned hereinabove, the individual light conducting elements of each of the bundles 4 are spread out into at least one flat layer which is then wound around the common axis. If more than one flat layer is produced, these layers are superimposed into a stack which is then subsequently wound around the common axis. As a result of the winding of the flat layer or layers, the individual light conducting elements of each of the bundles 4 is distributed over the entire surface 31 of the coupling means 18 so that light generated by one of the sources 9, 10 and 11 such as the source 9 will be distributed over the entire area of the display plate 8. When the sources 9 and 11 are turned or switched off and the source 10 is turned on, in a similar manner, the light conducted by the bundles extending from the filter 16 will be distributed over the entire area of the display plate 8. As illustrated in FIG. 2, the coupling means 18 acts to distribute the light in the various groups of bundles 4 uniformly on the light exit surface 31.

If desired, the wound layer or layers of conducting elements of the means 18 may include the carrier member as described hereinabove. If desired, this carrier member may be used only temporarily and removed after affixing an additional securing means.

Although various minor modifications may be suggested by those versed in the art, it should be understood that I wish to employ within the scope of the patent granted hereon, all such modifications as reasonably and properly come within the scope of my contribution to the art.

I claim:

1. In a device for the transmission of light by means of optical conductors between a first and second location and particularly useful in both an apparatus for the representation of symbols on a display surface and an optical display apparatus for railroad and street traffic control, said device including a source of illumination, a display surface, and a plurality of conductor bundles with each bundle being composed of a plurality of individual optical conductors, said conductors being positioned with a light input end being disposed adjacent the source of illumination and a light output end being disposed adjacent the display surface, said bundles being gathered together into a strand of conductors at one of said input and said output ends, the improvement comprising light mixing means for obtaining substantially uniform distribution of the intensity of light leaving the strand of conductors, said light mixing means having a first and second end and being disposed with the first end at the bundles and with the second end at one end of the strand, said light mixing means comprising a plurality of individual light conducting elements, said conducting elements at a point spaced from said first end being spread into a substantial layer of elements of a thickness of one element, said layer being spirally wound around a common main axis extending parallel to the optical conductors so that the conducting elements of the light mixing means are uniformly distributed across an area of the second end of said means.

2. In a device according to claim 1, wherein the light mixing means is a separate unit positioned at said one end, said unit having conducting elements which are separate from the elements of the bundles of the strand of conductors.

3. In a device according to claim 1, wherein the light mixing means is integrally formed with said one end of the bundles.

4. In a device according to claim 1, which includes means for additionally securing the conductor elements adjacent said second end of the light mixing means.

5. In a device according to claim 4, wherein the means for additional securing comprises a shrink-on tube.

6. A method of forming a light mixing means for obtaining substantially equal distribution of the intensity of light entering and leaving a strand of gathered together conductors, said light mixing means having a first and second end, the method comprising providing a plurality of conductor elements gathered into individual conductor bundles, spreading the conductor elements at a point spaced from the first end into at least one flat layer of elements, winding the flat layer of elements spirally around an axis extending parallel to the axis of the light mixing means so that the conductor elements of each of the conductor bundles are uniformly distributed across an area of the second end of the light mixing means.

7. A method according to claim 6, which subsequent to the step of spreading the conductor elements into a layer includes applying a carrier element to the conductor elements adjacent the second end and then winding the layer of spread conductor elements and carrier element.

8. A method according to claim 7, which subsequent to the step of winding the layer of conductor elements and carrier element includes applying additional securing means adjacent to the wound carrier element.

9. A method according to claim 8, wherein said carrier element is formed of a material capable of being selectively removed, wherein the step of applying the carrier element applies the carrier element spaced inward from said second end of the light mixing means, wherein the step of applying the additional securing means applies the additional securing means between the wound carrier element and said second end and which method subsequent to the step of applying the additional securing means includes removing the carrier element.

10. A method according to claim 8, wherein the step of applying the carrier element applies the carrier element at the second end of the light mixing means, wherein the step of applying the additional securing means applies the securing means inwardly of said carrier element and which method further includes severing the carrier element and the ends of the conductor element engaged thereby from the light mixing means.

* * * * *